US012515502B2

(12) United States Patent
Ginja et al.

(10) Patent No.: US 12,515,502 B2
(45) Date of Patent: Jan. 6, 2026

(54) OPENING PANEL OF A MOTOR VEHICLE PROVIDED WITH A PLATE FOR SUPPORTING EQUIPMENT

(71) Applicant: OPmobility SE, Lyons (FR)

(72) Inventors: Stéphane Ginja, Lyons (FR); Gérald Andre, Sainte-Julie (FR); Franck Leterrier, Sainte-Julie (FR)

(73) Assignee: OPmobility SE, Lyons (FR)

( * ) Notice: Subject to any disclaimer, the term of this patent is extended or adjusted under 35 U.S.C. 154(b) by 170 days.

(21) Appl. No.: 18/258,980

(22) PCT Filed: Dec. 20, 2021

(86) PCT No.: PCT/EP2021/086798
§ 371 (c)(1),
(2) Date: Jun. 22, 2023

(87) PCT Pub. No.: WO2022/136276
PCT Pub. Date: Jun. 30, 2022

(65) Prior Publication Data
US 2024/0066963 A1   Feb. 29, 2024

(30) Foreign Application Priority Data

Dec. 23, 2020 (FR) .................................. FR2014055

(51) Int. Cl.
*B60J 5/10* (2006.01)
*B60J 5/04* (2006.01)

(52) U.S. Cl.
CPC ............. *B60J 5/107* (2013.01); *B60J 5/0416* (2013.01)

(58) Field of Classification Search
CPC ... B60J 5/101; B60J 5/107; B60J 5/108; B60J 5/0416; B60J 5/0415; B60J 5/045; B60J 5/0468; B60R 11/04; B60R 2011/0021
(Continued)

(56) References Cited

U.S. PATENT DOCUMENTS 5,281,780 A * 1/1994 Haland .................. B60J 5/0437
200/52 R
6,019,418 A * 2/2000 Emerling ................. B60J 5/101
296/146.7
(Continued)

FOREIGN PATENT DOCUMENTS

DE    102010053446 A1    2/2012
DE    102012024568 A1 *  7/2013  ............ B60J 5/0412
(Continued)

OTHER PUBLICATIONS

Adis et al. (DE 102012024568 A1), machine translation (Year: 2013).*
(Continued)

*Primary Examiner* — Amy R Weisberg
*Assistant Examiner* — Wenwei Zhuo
(74) *Attorney, Agent, or Firm* — M&B IP Analysts, LLC

(57) ABSTRACT

The present disclosure relates to a motor vehicle opening panel, comprising an inner panel, preferably made of plastic material, an outer skin which is at least partially made of plastic material and attached to the inner panel, comprising an inner surface facing an outer surface of the inner panel, and a plate for supporting equipment covered by the outer skin and directly attached in a sealed manner to the inner surface of the outer skin, said plate being disposed within an internal volume delimited, on the one hand, by the outer surface of an inner panel and, on the other hand, by the inner surface of the outer skin.

18 Claims, 5 Drawing Sheets

(58) Field of Classification Search
USPC ....... 296/146.1, 56, 50, 146.8, 146.5, 146.6, 296/146.7; 49/502
See application file for complete search history.

(56) References Cited

U.S. PATENT DOCUMENTS

| | | | | |
|---|---|---|---|---|
| 6,412,852 | B1 * | 7/2002 | Koa | B60R 13/0206 |
| | | | | 296/146.7 |
| 6,854,785 | B2 * | 2/2005 | Simon | B60J 5/0416 |
| | | | | 296/146.7 |
| 7,410,204 | B2 * | 8/2008 | Koa | B60J 5/0416 |
| | | | | 296/152 |
| 10,195,926 | B2 * | 2/2019 | Sugie | G01S 7/02 |
| 11,850,926 | B2 * | 12/2023 | Leterrier | B60J 5/107 |
| 12,251,995 | B2 * | 3/2025 | Leterrier | B60J 5/0415 |
| 2006/0043764 | A1 * | 3/2006 | Schroder | B60R 13/0892 |
| | | | | 296/146.7 |
| 2010/0266806 | A1 * | 10/2010 | Owens | B32B 5/22 |
| | | | | 423/447.2 |
| 2018/0134130 | A1 * | 5/2018 | Nagaishi | B60J 5/0461 |

FOREIGN PATENT DOCUMENTS

| | | | | |
|---|---|---|---|---|
| DE | 102013225872 | A1 | 7/2015 | |
| EP | 1842708 | A1 * | 10/2007 | ............ B60J 5/0416 |
| EP | 3674117 | A1 * | 7/2020 | ............ B60J 5/107 |
| WO | WO-2004060705 | A1 * | 7/2004 | ............ B60J 5/0416 |

OTHER PUBLICATIONS

International Search Report for PCT/EP2021/086798, dated Mar. 29, 2022. International bureau of WIPO.

* cited by examiner

OPENING PANEL OF A MOTOR VEHICLE PROVIDED WITH A PLATE FOR SUPPORTING EQUIPMENT

The present disclosure relates to the field of motor vehicle bodywork parts, more specifically opening panels, such as tailgates or side doors, and in particular the integration of equipment items that are installed therein.

For example, a motor vehicle tailgate generally includes an outer panel (also referred to as outer skin) attached to an inner panel, or frame. The inner panel is provided with a first opening in the upper part of the tailgate intended to accommodate a window. In the lower part of the tailgate, this inner panel is generally provided with small cavities that allow a local routing for the attachment of components.

On most vehicles, motor vehicle tailgates incorporate, in the lower part of the tailgate, rear lateral signaling lights, such as stop lights, generally a left light and a right light located symmetrically on either side of the tailgate. Preferably, these two lights are situated as far as possible along the lateral edges of the tailgate in order to face, in the closed position of the tailgate, the rear light complement located on the vehicle body. Such lights are currently manufactured by suppliers in the form of lighting units or optical units. Such optical units includes a rear part, or housing, in which the lighting device is arranged, as well as a window, also referred to as glass, allowing light to pass when the light is in operation. These two side lights are attached to and mounted on the tailgate on and by its outer face, which presents a number of drawbacks.

Firstly, it is necessary to provide a glass that is sealed relative to the optical housing in order to protect the lighting device. In addition, it is appropriate for an operator to mount the two side lights at two discrete locations of the tailgate, to connect electrical harnesses thereto, and to make the mounting sealed to prevent runoff water from penetrating into the volume delimited by the inner panel and the outer skin of the tailgate, by passing between the light and the outer skin, which presents practical difficulties.

Another drawback lies in the fact that the side lights mounted in this way appear as additions and do not exhibit any apparent continuity with the rest of the tailgate, which is detrimental to the appearance thereof. Indeed, it is a trend among automobile manufacturers to ensure that the various outer surfaces of the vehicle are flush with one another and appear to be seamless. In some configurations, light-emitting elements may even remain partially or totally invisible from the outside, for example when they are not activated ("hidden until lit").

Furthermore, in addition to the matter of the side lights, another trend among automobile manufacturers is to integrate a light signature at the rear of the vehicles, such as for example continuous lighting between the side parts of the tailgate. In general, such a light-emitting device is also mounted via the exterior of the tailgate and may pose sealing problems or not be flush with the rest of the tailgate.

Finally, tailgates may incorporate components that make it possible to assist with driving (such as radars, lidars or cameras) or allow communication (such as antennas or screens). All of these components should be integrated into the tailgate in such a way, here again, as to be sealed and flush with the rest of the tailgate.

All of the technical problems described for the example of the tailgate can be generalized to other types of opening panels, for example side doors in which light-emitting elements and other components for assistance with driving or communication can also be integrated between the inner panel and the outer panel.

The object of the present disclosure is in particular to overcome these disadvantages by providing an opening panel of a motor vehicle making it possible to integrate, in its lower part, equipment, in particular radiation emitters and/or receivers, in a sealed manner and making it possible to improve the aesthetics of the vehicle.

To that end, the present disclosure relates to an opening panel of a motor vehicle including:
  an inner panel, preferably made of plastic material, provided with an upper part in which a first opening is formed intended to accommodate a window and a lower part in which a second opening is formed, and
  an outer skin, at least partially made of plastic material, mounted on the inner panel, including an inner surface located facing an outer surface of the inner panel.

The opening panel according to the various disclosed embodiments further includes a plate for supporting equipment attached directly to the inner surface of the outer skin in a sealed manner, preferably by gluing, said plate being disposed within a volume delimited, on the one hand, by the outer surface of an inner panel and, on the other hand, by the inner surface of the outer skin.

By virtue of the presence of a plate for supporting equipment borne and covered by the outer skin and disposed within a volume delimited, on the one hand, by the outer surface of an inner panel and, on the other hand, by the inner surface of the outer skin, it is possible for light-emitting, communication or driving-assistance devices to be borne by the plate for supporting equipment rather than attaching them to the outer skin of the opening panel, which facilitates their implementation within the opening panel, at the desired position for each item of equipment, since they are assembled beforehand on the plate, which is then attached to the outer skin.

Thus, the aesthetics of the vehicle are improved since the equipment does not appear as additions and does not have any apparent discontinuity with the rest of the opening panel.

Furthermore, it is also possible to ensure that the equipment borne by the supporting plate is concealed by the outer skin, including, in the case of a tailgate, the rear lights, for example when they are not switched on. "Concealed by the outer skin" is understood to mean that the equipment is not obviously visible to a user.

In addition, the fact that the plate for supporting equipment is borne by the outer skin in a sealed manner directly on the inner surface of the outer skin makes it possible to create a specific "dry zone" for the equipment borne by the supporting plate. "Dry zone" is understood herein to mean a closed, sealed volume with respect to the outside environment. Thus, all the equipment borne by the supporting plate is insulated in a sealed manner from the outside environment via the sealed connection obtained between the supporting plate and the outer skin. This is much easier than providing the seal around each equipment individually, as for the lighting units. This ultimately makes it possible to preserve these items of equipment and therefore ensure their proper operation.

Finally, the supporting plate makes it possible to share the connections of the items of equipment that it bears.

According to other optional features of the opening panel taken either alone or in combination:
  the plate for supporting equipment includes a device for emitting and/or receiving electromagnetic radiation and the outer skin includes, facing the device for emitting and/or receiving electromagnetic radiation, a transmission zone, made of plastic material, which is at least partially transparent to said electromagnetic radiation;

the electromagnetic radiation belongs to the visible spectrum;

the electromagnetic radiation belongs to the non-visible spectrum, for example that of infrared, microwaves, to the 76-77 GHz band of automobile radars, radio or telephony waves;

the supporting plate includes at least one opening for accessing one of the items of equipment borne by the supporting plate, and preferably at least one member for closing said access opening allowing for the replacement or the adjustment of certain elements borne by the plate. Indeed, certain elements such as radars or lidars, for example, may need fine adjustment borne out after the assembly of the opening panel on the vehicle;

the inner panel includes at least one opening for accessing the delimited volume;

the access opening of the inner panel faces said at least one access opening of the supporting plate;

the inner panel further includes at least one removable hatch allowing the access opening to be reclosed;

a trim attached to the inner wall of the inner panel and covering the second opening;

the trim covers said at least one removable hatch;

the trim covers the access opening and includes a removable part allowing access to the plate and to its equipment via the access opening;

a technical panel attached to the inner panel carrying a set of technical elements for the passage or attachment of components, the technical panel for example bearing at least one of the following elements:

holes for routing elements such as wires, linkages, pipes, attachment interfaces, connectors, attachment interfaces for systems such as a motorized lock or a window washer motor, and shapes for mechanical reinforcement such as ribs or bosses;

the supporting plate is formed as one piece;

the supporting plate is made of several parts assembled together;

the outer skin is made from one of the following materials: polypropylene (PP), polyamide (PA), polyethylene (PE), acrylonitrile butadiene styrene (ABS), polyethylene terephthalate (PET), polystyrene (PS), polycarbonate (PC), polymethyl methacrylate (PMMA), cyclo-olefin copolymer (COC), and any combination of these materials; and the opening panel includes a tailgate or a side door.

BRIEF DESCRIPTION OF THE FIGURES

The present disclosure will be better understood on reading the following description, wherein the opening panel of the various disclosed embodiments are described in the form of a tailgate, given solely by way of example and with reference to the appended drawings wherein.

DETAILED DESCRIPTION

FIGS. 2 to 4B show a tailgate of a motor vehicle 1 according to one embodiment of the various disclosed embodiments and several variants thereof.

Figure 2:
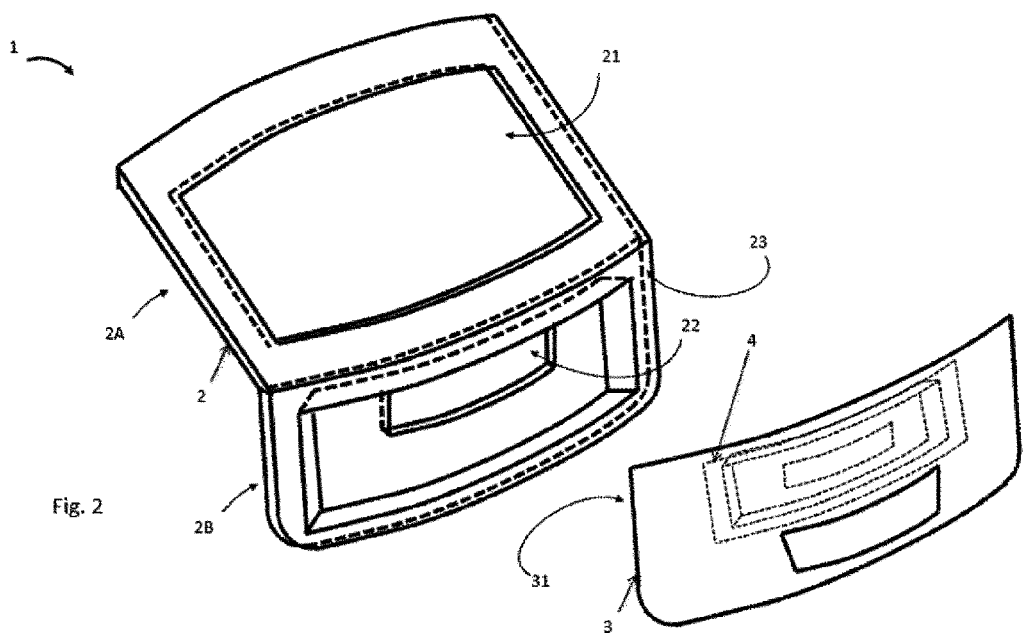
FIG. 2 is an exploded schematic view of a tailgate according to an embodiment.

Reference is now made to FIG. 2, which illustrates an embodiment of a tailgate 1 of a motor vehicle according to an embodiment. The tailgate 1 includes:

an inner panel 2, preferably made of plastic material, provided with an upper part 2A in which a first opening 21 is formed intended to accommodate a window 7 and a lower part 2B in which a second opening 22 is formed, and an outer skin 3, at least partially made of plastic material, attached to the inner panel 2, including an inner surface 31 located facing an outer surface 23 of the inner panel 2. The tailgate 1 further includes a plate for supporting equipment 4 attached directly to the inner surface 31 of the outer skin 3 in a sealed manner, by gluing, said plate 4 being disposed within an internal volume 5A delimited, on the one hand, by the outer surface 23 of an inner panel 2 and, on the other hand, by the inner surface 31 of the outer skin 3.

Figure 1A:
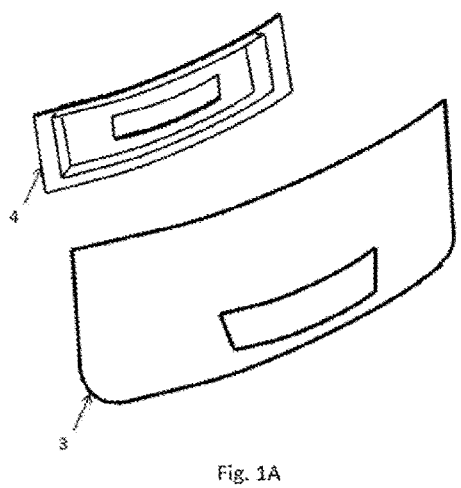
FIG. 1 is a set of schematic views (FIG. 1A in exploded view and 1B assembled) of a plate for supporting equipment and an outer skin of a tailgate according to one embodiment.
Figure 1B:
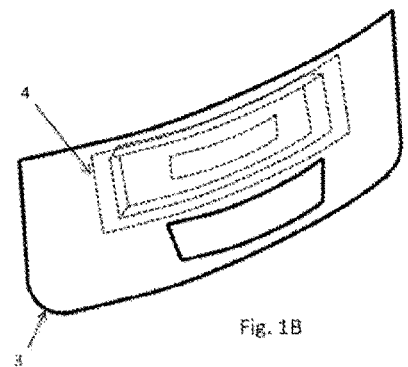

The plate for supporting equipment 6 is a housing forming a hollow receptacle, the peripheral edges of which match the shape of the outer skin 3 to which the plate 4 is attached, as shown in FIGS. 1A and 1B. The peripheral edges of the plate 4 glued (or adhesively bonded) onto the outer skin 3 includes a flat flange 51 that receives the bead of glue 50 (or the adhesive). These same flat peripheral flanges can also be used to compress a foam seal in the case that the mounting plate is attached by screwing and or clipping (variant embodiments not shown). The plate 4 is attached by bonding, by means of any suitable bonding method known to a skilled person.

Figure 3:
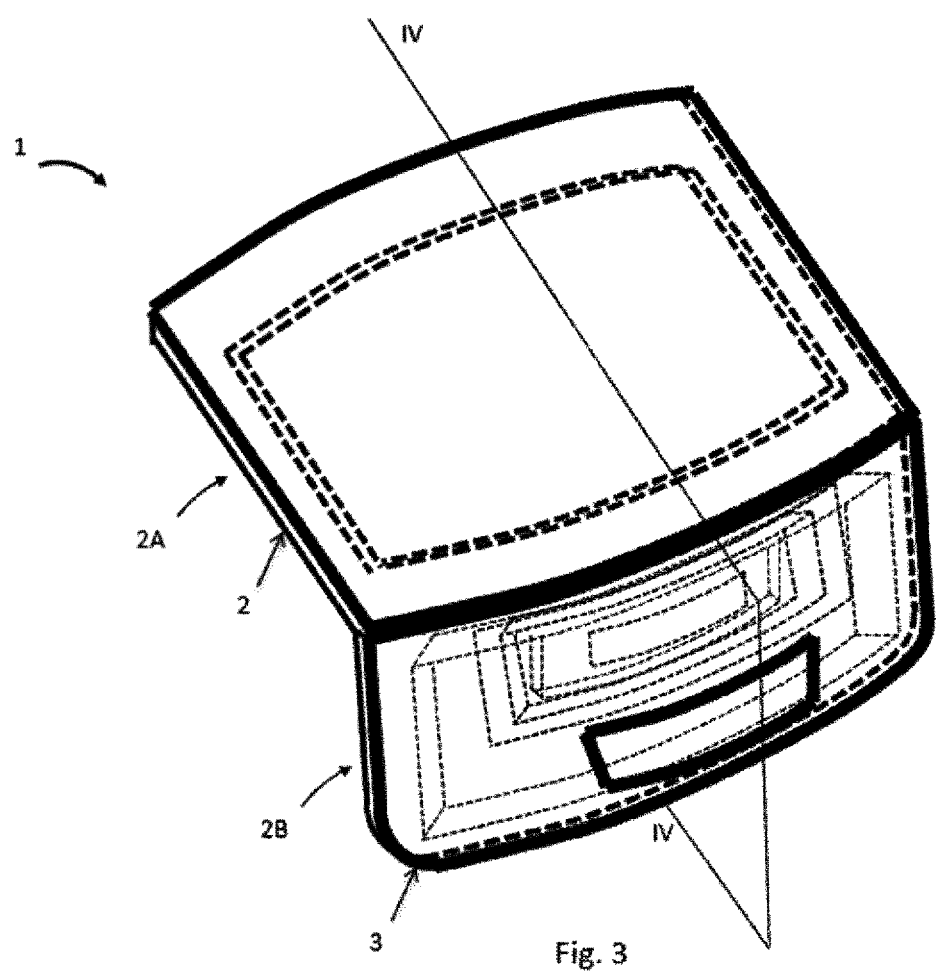
FIG. 3 is a schematic view of a tailgate assembled according to an embodiment.
Figure 4:
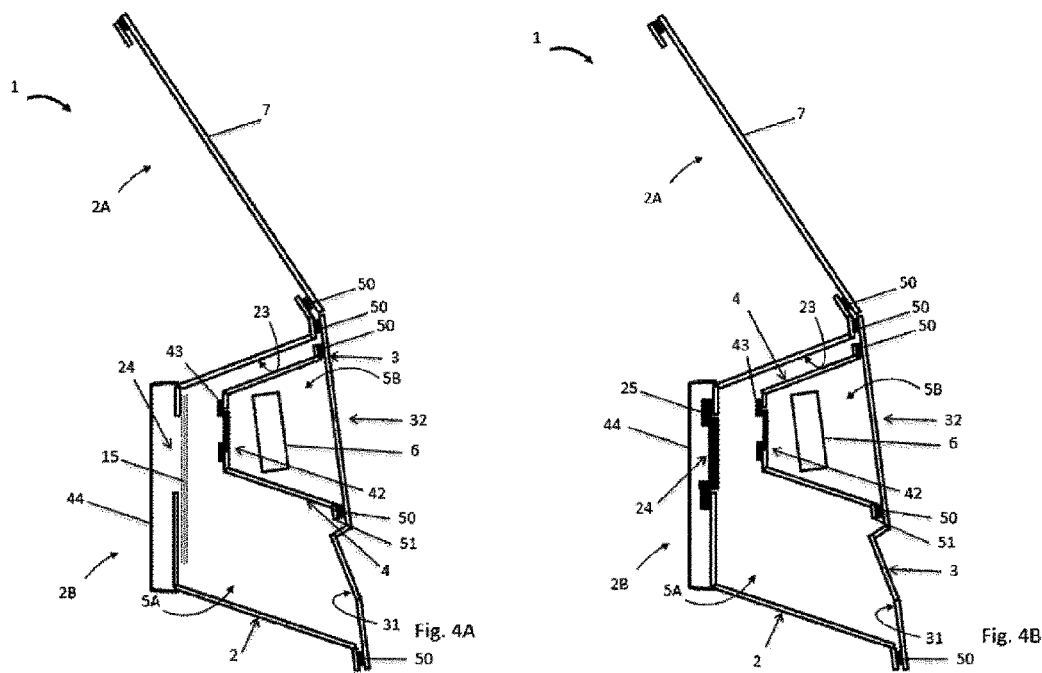
FIG. 4 is a set of schematic cross sections (FIGS. 4A and 4B) produced along the cross sectional plane IV-IV of FIG. 3, depicting a tailgate according to some embodiments.

The tailgate illustrated in FIG. 2 is depicted assembled in FIG. 3. Two variants are depicted in FIGS. 4A and 4B, in the form of cross sections produced along the cross sectional plane IV-IV of FIG. 3.

The plate includes several items of equipment 6, only one of which is visible in the cross sections shown in FIGS. 4A and 4B. Of course, the plate may include a single item of equipment 6 or several items of equipment 6 and these may be different from one another. For example, this may be one or more light-emitting devices that emit electromagnetic radiation in the visible spectrum. These light-emitting devices can be distributed over all or part of the width of the plate 4 in order to establish the desired light signature. Thus, it is possible to obtain a light signature of continuous appearance over the entire width of the tailgate if desired. These items of equipment 6 can also be driving-assistance devices, such as, for example, radars (which generally emit electromagnetic radiation between 20 and 80 GHz), lidars (which generally emit electromagnetic radiation belonging to the infrared spectrum) or backup cameras. Finally, they may also include communication equipment, such as screens or antennas. Generally, these items of equipment may be any device requiring transparency to waves.

The area of the outer skin 3 located facing the equipment 6 is a transmission zone 32 made of plastic material at least partially transparent to the electromagnetic radiation of the equipment, in the case where the latter emits and/or receives electromagnetic radiation. "Less transparent to electromagnetic radiation" is understood to mean that this transmission zone 32 allows the passage of a sufficient amount of electromagnetic waves so that the equipment can fulfill the function for which it is dedicated correctly and continuously. In the case of a light-emitting device, for example, this means that the transmission zone 32 allows the light rays emitted by the device to pass so that they can be seen by an observer outside the vehicle.

Figure 5:
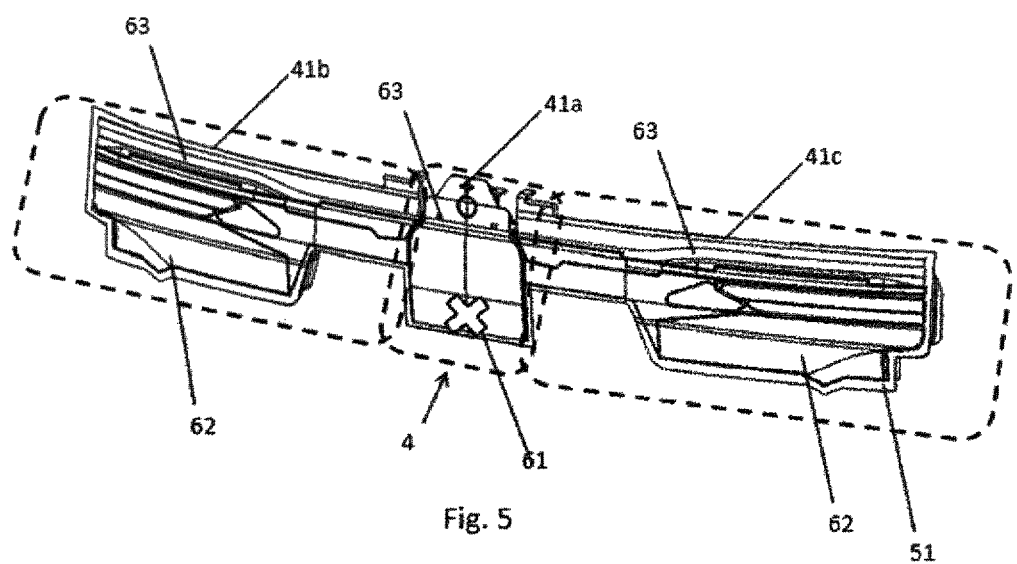
FIG. 5 is a more detailed depiction of a plate for supporting equipment used in an opening panel according to an embodiment, such as a tailgate described in the preceding figures.

The supporting plate 4 can be formed as one piece, which simplifies its manufacture and avoids the steps of assembling several elements on the outer skin 3. Alternatively, the supporting plate 4 can be made of several parts (41a, 41b and 41c) assembled together (as depicted in FIG. 5), either before being introduced into the internal volume 5A, or after having been introduced into the internal volume 5A. This second assembly variant has the advantage of being able to integrate such a plate, even when the first opening 21 of the inner panel is reduced.

As shown in FIG. 5, the plate 4 includes three parts, one central 41a, and two lateral 41b and 41c.

The central part 4a includes an element forming an illuminated logo 61. The lower area of the lateral parts 41b and 41c can for example form right and left signaling lights 62. The upper area of the three parts 41a, 41b and 41c taken together forms a continuous lighting line 63 transverse to the tailgate 1 and thus producing a light signature. This upper part can also make it possible to house a large antenna.

As depicted in FIGS. 4A and 4B, the supporting plate 4 is provided with an access opening 42 which makes it possible to access the various items of equipment borne by the plate 4, for example for the installation or maintenance thereof. This access opening 42 is closed via a closure member 43 which thus makes it possible to create an additional closed internal volume 5B within the main internal volume 5A. Thus, the items of equipment 6 borne by the supporting plate 4 are located within a dry and sealed zone that protects them. The sealing of the volumes 5A and 5B is also ensured by virtue of the peripheral and continuous beads of glue 50 connecting the various elements (inner panel 2, outer skin 3 and supporting plate 4) to one another. Of course, any other attachment means known to a person skilled in the art making it possible to connect these various elements in a sealed manner can be used.

In order to guarantee access to the internal volume 5A, once the tailgate has been assembled and mounted on the vehicle, the inner panel 2 includes an access opening 24. To allow easier access to the additional internal volume 5B, and therefore to the items of equipment 6 borne by the supporting plate 4, the access opening 24 is located opposite the access opening 42 of the supporting plate 4 (FIG. 4B). Of course, the tailgate according to an embodiment may have several access openings 24 distributed on the inner panel 2, and several access openings 42 distributed in the plate 4 facing each access opening 24, in order to be able to easily access all of the items of equipment 6 borne by the plate 4.

According to the variant illustrated in FIG. 4B, in order to guarantee the sealing of the internal volume 5A, the inner panel 2 includes a removable hatch 25 provided to cover the access opening 24 of the inner panel. Thus, it is possible to temporarily remove this hatch 25 in order to access the elements located inside the internal volume 5A.

According to the variant illustrated in FIG. 4A, the tailgate 1 may further includes a technical panel 15 as described in document FR 1358548 attached to the outer surface 23 of the inner panel. This technical panel 15 makes it possible to carry a set of technical elements for the routing or attachment of components, such as for example the wiring harness for the equipment of the plate 4.

According to a variant of the disclosed embodiment not shown, the tailgate 1 further includes a trim 44 attached to the inner wall of the inner panel 2 and covering the second opening 22. Advantageously, this trim 44 covers the removable hatch 25 as illustrated in FIG. 4A and thus makes it possible to further guarantee the sealing of the internal volume 5A. The trim 44 can be attached to the lower part 2B of the inner panel 2 in a removable manner, for example by riveting, screwing or snap-attachment.

The present disclosure is not limited to the embodiments presented, and other embodiments will become clearly apparent to those skilled in the art.

What is claimed is:

1. A motor vehicle opening panel comprising:
   an inner panel, provided with an upper part in which a first opening is formed and a lower part in which a second opening is formed, wherein the first opening is adapted to accommodate a bezel; and
   an outer skin, at least partially made of plastic material, mounted on the inner panel, having an inner surface adapted to face an outer surface of the inner panel, characterized in that it further comprises a supporting plate for supporting equipment items covered by the outer skin and attached directly to the inner surface of the outer skin in a sealed manner, said plate being disposed inside an internal volume delimited, on one hand, by the outer surface of the inner panel and, on another hand, by the inner surface of the outer skin, wherein the directly attached supporting plate and the outer skin create an additional closed internal volume within the internal volume in order to protect the equipment items within the additional closed internal volume.

2. The motor vehicle opening panel according to claim 1, wherein the plate for supporting equipment comprises a device for emitting and/or receiving electromagnetic radiation and the outer skin comprises, facing the device for emitting and/or receiving electromagnetic radiation, a transmission zone, made of plastic material, which is at least partially transparent to an electromagnetic radiation.

3. The motor vehicle opening panel according to claim 2, wherein the electromagnetic radiation belongs to a visible spectrum.

4. The motor vehicle opening panel according to claim 2, wherein the electromagnetic radiation belongs to a non-visible spectrum.

5. The motor vehicle opening panel according to claim 1, wherein the supporting plate comprises at least one opening for accessing one of items of equipment borne by the supporting plate.

6. The motor vehicle opening panel according to claim 5, wherein the inner panel comprises at least one opening for accessing the delimited internal volume.

7. The motor vehicle opening panel according to claim 6, wherein the at least one opening of the inner panel faces said at least one opening of the supporting plate.

8. The motor vehicle opening panel according to claim 6, wherein the inner panel further comprises at least one removable hatch allowing the access opening of the inner panel to be reclosed.

9. The motor vehicle opening panel according to claim 1, further comprising a trim attached to an inner wall of the inner panel and covering the second opening.

10. The motor vehicle opening panel according to claim 8, wherein a trim covers said at least one removable hatch, wherein the trim attached to an inner wall of the inner panel and covering the second opening.

11. The motor vehicle opening panel according to claim 1, further comprising a technical panel attached to the inner panel carrying a set of technical elements for a routing or attachment of components, the technical panel carrying at least one of the following elements:
- holes for routing elements, wherein the routing elements are at least one of: wires, linkages, pipes, attachment interfaces, and connectors;
- attachment interfaces for systems, wherein the systems are any one of: a motorized lock and a window washer motor; and
- forms of mechanical reinforcement, wherein the mechanical reinforcement is any one of: ribs and bosses.

12. The motor vehicle opening panel according to claim 1, wherein the supporting plate is formed as one piece.

13. The motor vehicle opening panel according to claim 1, wherein the supporting plate is made of several parts assembled together.

14. The motor vehicle opening panel according to claim 1, wherein the outer skin is made from at least one of the following materials:
- polypropylene (PP);
- polyamide (PA);
- polyethylene (PE);
- acrylonitrile butadiene styrene (ABS);
- polyethylene terephthalate (PET);
- polystyrene (PS);
- polycarbonate (PC);
- polymethyl methacrylate (PMMA); and
- cyclo-olefin copolymer (COC).

15. The motor vehicle opening panel according to claim 1, further comprising a tailgate or a side door.

16. The motor vehicle opening panel according to claim 1, wherein the inner panel is made of a plastic material.

17. The motor vehicle opening panel according to claim 1, wherein the plate attached to the inner surface of the outer skin is sealed by gluing.

18. The motor vehicle opening panel according to claim 5, wherein the supporting plate further comprises at least one member for closing the at least one access opening of the supporting plate.

* * * * *